Jan. 22, 1935.  B. G. ALDRIDGE  1,988,768
DEWAXING OILS
Filed July 25, 1933
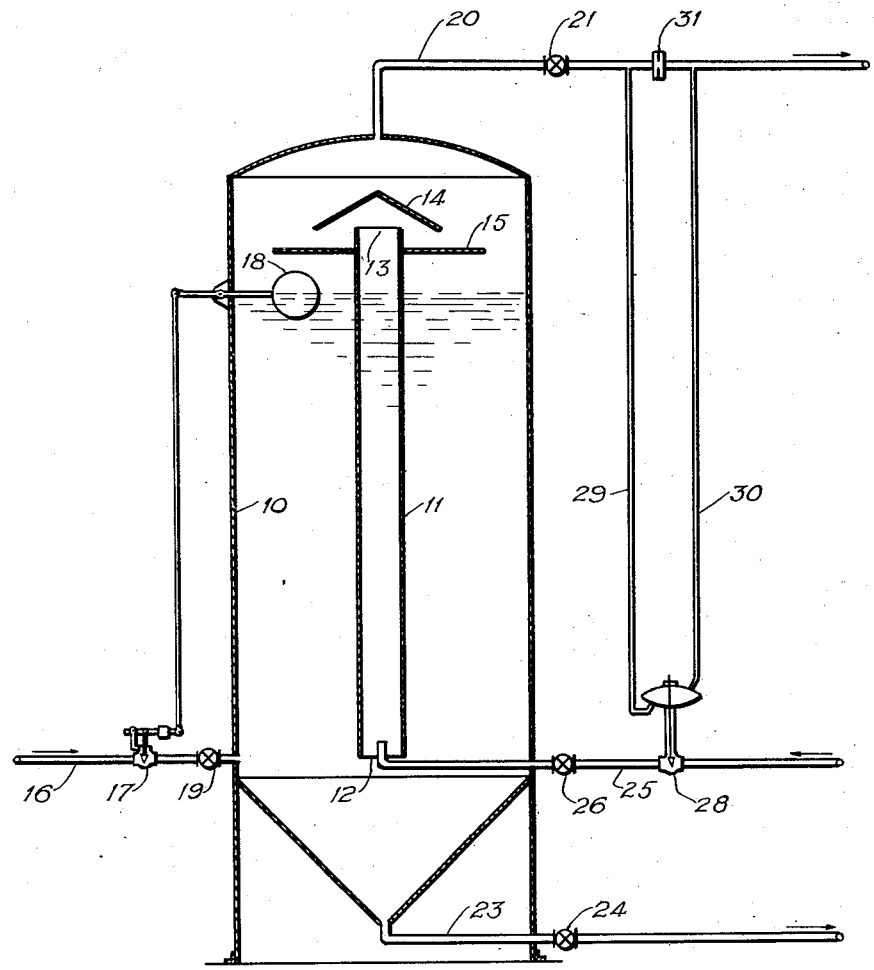
INVENTOR
BLAIR G. ALDRIDGE
BY
ATTORNEY.

Patented Jan. 22, 1935

1,988,768

UNITED STATES PATENT OFFICE 1,988,768

DEWAXING OILS

Blair G. Aldridge, Los Angeles, Calif., assignor to Union Oil Company of California, Los Angeles, Calif., a corporation of California Application July 25, 1933, Serial No. 682,073

5 Claims. (Cl. 62—170)

The present invention relates to a process and an apparatus for the separation of wax from wax-containing mixtures, and more particularly it relates to a process and apparatus for the separation of wax from lubricating oil fractions wherein liquefied normally gaseous hydrocarbons are employed as a diluent for the oil and as a refrigerating medium.

Recently a method has been developed for the separation of wax from the oil to be treated by the use of liquefied normally gaseous hydrocarbons, such as liquefied ethane, propane, butane, ethers, light chlorinated hydrocarbons, or mixtures thereof, both as diluents for the oil and as refrigerants for the mixture. The above described normally gaseous hydrocarbons, employed as diluents and refrigerants, are subjected to a pressure sufficient to liquefy them and to maintain them at normal temperatures in the liquid state. According to the method developed previously, the waxy oil is dissolved in one or more of the above mentioned normally gaseous hydrocarbons, said mixture being approximately in the proportion of about one part of the waxy oil to from three to five parts of the diluent, depending on the character of the oil being treated. After dissolving the waxy oil in the normally gaseous diluent maintained under a pressure sufficient to keep it in a liquid state under ordinary temperatures, the solution of oil and diluent is chilled by vaporizing a portion of the liquefied normally gaseous hydrocarbons used as the diluent. The chilling is carried down to temperatures sufficient to precipitate the wax from the oil, these temperatures ranging from +10° F. to —40° F. depending upon the character of the oil to be dewaxed, the ratio or proportion of waxy oil to diluent and the quantity of wax present in the oil being treated. After the chilling of the diluted oil by vaporization of a portion of the diluent to a suitable temperature, the chilled mass or mixture, consisting of oil, diluent and precipitated wax, is conveyed to some mechanical or other means, such as filters, centrifuges or settling chambers, for separating the thus precipitated wax from the oil and diluent. After the separation of the wax from the diluted mixture by one of the above means, the diluted and dewaxed oil is then distilled to separate from the thus dewaxed oil the remaining portion of the liquefied normally gaseous hydrocarbons used in this process both as a diluent and as a refrigerant.

In the usual application of the above process the mixture of waxy oil and of liquefied normally gaseous hydrocarbons are conveyed under pressure into chilling towers wherein the mixture is cooled by a regulated reduction of pressure in the towers. The pressure reduction causes a vaporization of a portion of the liquefied diluent, this vaporization in turn causing a chilling of the oil mixture and a resultant precipitation of the wax dissolved therein. However, it has been found that such a procedure is accompanied by certain disadvantages. Thus, in view of the fact that the towers used for the chilling step are usually comparatively tall, since the cross-sectional area of these towers is comparatively small, and since the vapor lines, used in conjunction with these towers for lowering the pressures therein, lead substantially from the upper ends thereof, the vaporization of the normally gaseous hydrocarbons used as a diluent and refrigerant is unequal in the different parts of the tower. As is obvious, the vaporization of the diluent-refrigerant is mostly near the surface of the mixture. Such an unequal chilling of the diluted oil has a tendency to produce "bumping" or sudden flashing of the oil. This flashing, frothing and violent boiling of the diluted mixture is highly undesirable because it causes the diluted waxy oil to be forced from the top portion of the chilling tower into the vapor line with a resultant clogging of said line and a loss of a portion of the oil being treated.

Furthermore, the wax precipitating during the chilling stage usually assembles at the bottom of the chilling tower, and has a tendency to clog the opening leading into the discharge line communicating with the wax-separating means.

It is, therefore, the main object of the present invention to provide a process and apparatus whereby the above disadvantages are removed.

It is another object of the invention to provide a method and means to dewax oil without causing any violent boiling of the diluted oil in the chilling step.

It is still another object of the invention to provide a method and apparatus to dewax oil without permitting said wax to precipitate out and clog the discharge line.

It is still a further object of the invention to provide a method and apparatus to cause a regulated agitation of the diluted oil being chilled and at the same time to increase the evaporating surface.

It has now been discovered that these objects may be accomplished by circulating the diluted oil being chilled. The invention, therefore, broadly stated, resides in a method and apparatus whereby the waxy oil and diluent are agitated in the chilling step so as to cause a more uniform chilling of the mixture in the various zones of the chilling chamber. More specifically stated the invention comprises providing gas-lifting means within the chilling chamber and injecting a normally gaseous hydrocarbon, such as propane or other gases, such as carbon dioxide, ammonia, nitrogen, etc., at a regulable rate to provide a jetting or gas-lifting effect and thus circulating the diluted oil being treated. In its preferred form, the invention further resides in a chilling chamber, means for introducing thereinto a mixture of waxy oil and a liquefied normally gaseous hydrocarbon, such as liquid propane, a pipe vertically aligned within the chamber, and open at both ends so that the upper end is above the liquid level, a vapor line leading from the upper end of the chamber, a line leading the chilled mixture from the lower end of the chamber to the wax removing means and a line for conducting liquefied but normally gaseous hydrocarbons into the lower portion of the above described vertically aligned tube. It is obvious that such an introduction of a regulable quantity of a warm liquid propane into the bottom of the tube will cause a jetting or siphoning effect in the tube thus creating a circulation of the diluted oil being treated. This permits a more uniform chilling of the mixture, increases the evaporating surface, and at the same time prevents the precipitating wax from settling out and clogging the discharge line from the chilling chamber.

Referring now more specifically to the accompanying drawing, the sole figure on which shows diagrammatically a vertical section through a preferred embodiment of the present invention: A chilling chamber 10 is provided with a vertical tube 11, positioned axially therein and open at both ends 12 and 13, respectively. The upper end 13 of this tube is provided with baffle plates 14 and 15 which receive the overflow from the tube. Line 16 leads into the chilling chamber and is adapted to conduct thereinto the mixture of waxy oil and liquefied normally gaseous hydrocarbons. This line is provided with an automatic valve 17 actuable by a float 18 within chamber 10. This float 18 maintains the liquid level within the chamber constant. Line 16 is also provided with a manually operable valve 19. A vapor line 20 leads from the upper end of chamber 10 and is provided with a valve 21. Another line 23 leads from the bottom of said chamber, is provided with a valve 24, and is adapted to remove the chilled mass to any wax separating means, not shown in the drawing. This wax separating means may be either a settling tank, a filter press or a centrifuge.

A line 25 leads into the lower open end 12 of the tube 11 and is adapted to introduce thereinto the gaseous hydrocarbon or another gas used for the circulation of the diluted oil being treated. Since the rate of introduction of said hydrocarbon, such as propane, or of another gas, such as carbon dioxide, etc., must be regulated to produce the proper circulation of the mixture being treated, this line 25 may be provided with a manually actuable valve, such as valve 26. However, it is preferable to provide line 25 with an automatic valve actuable in relation to the rate of discharge of the vaporized diluent-refrigerant through line 20. Thus, as shown in the drawing, line 25 is provided with a diaphragm valve 28, the opposite sides of the diaphragm being connected by lines 29 and 30 respectively to the opposite sides of an orifice plate, or similar restriction, 31 in line 20. It is obvious that such an arrangement will open valve 28 automatically by opening valve 21 in line 20 and by passing vapors therethrough. It is also clear that valve 28 may be set to regulate the flow of propane, or other gas used for circulation, through line 25 in relation to the rate of flow of the vapors through line 20.

In operation, the waxy oil and the liquefied but normally gaseous hydrocarbon, such as for example propane, are mixed in the proper proportions, as described hereinabove, and are introduced through pipe 16 into chamber 10, the mixture being maintained under a pressure sufficient to keep the propane in a liquid state. This introduction is continued until the diluted waxy oil reaches the desired level within the chamber or tower 10 at which time valve 17 on inlet line 16 is automatically closed by the movement of the float 18. Thereupon valve 21 in vapor line 20 is opened to release the pressure in chamber 10, the degree of opening of said valve depending on the character of the diluted waxy oil and the rate of chilling desired. The drop in pressure in the upper portion of chamber 10 above the liquid level causes the evaporation of the diluent resulting in the chilling of the liquid mixture. To prevent the violent boiling and flashing accompanying the uneven evaporation of the diluent-refrigerant, valve 26 in line 25 is opened manually and propane or a similar normally gaseous hydrocarbon or another gas is injected therethrough into the lower end 12 of tube 11. This creates a jetting or gas-lifting effect through tube 11, the liquid mass being chilled and the propane introduced through pipe 25 rising through the tube 11, discharging out through opening 13, deflecting from baffle 14 onto baffle 15, and falling back into the liquid in chamber 10. It is clear that such a circulation of the diluted oil increases the evaporating surface, and at the same time tends to chill the mass more equally.

The evaporation of a portion of the diluent-refrigerant during the chilling step naturally lowers the liquid level in the chamber 10. Therefore, if it is desired to maintain the liquid level constant, valve 19 is kept open so as to permit float 18 to open valve 17 and thus allow the inflow of additional quantities of the diluted waxy oil until the desired level has been attained. However, if such a constant liquid level is not desired, valve 19 is closed and may be maintained so closed during the whole chilling step, as well as during the discharge of the chilled mass through line 23.

As stated previously, the introduction and regulation of the amount of propane introduced through pipe 25 may be made manually by regulating the manually operable valve 26. However, the same result may be obtained automatically by the use of valve 28. In such a case valve 26 remains open constantly, the regulation of the inflow of propane into tube 11 being obtained by the actuation of valve 21 in the vapor discharge line 20. Thus valve 28 in line 25 may be adjusted to close line 25 when there is no flow through vapor line 20, and at the same time to open when such flow begins upon the opening of valve 21. Such an arrangement is even more preferable to the manual operation of valve 26 in view of the fact that the automatic regulation permits the control of the rate of inflow of propane in relation or proportion to the rate of outflow of the vaporized propane through line 20.

When the mass in chamber 10 has been chilled to a sufficiently low temperature, which temperature, as stated above, ranges between +10° F. and −40° F., valve 21 in line 20 and valve 26 in line 25 are closed, and the chilled mass is discharged through line 23 by opening valve 24. At such a temperature the wax precipitates from the oil being treated so that a subsequent separation of the wax may be made easily by settling, filtering or centrifuging the chilled mass.

It is to be understood that the above disclosures are not to be considered as limiting but merely as illustrative of the generic invention and that many variations may be made within the scope of the appended claims.

I claim:

1. In a method for removing wax from wax-containing oil the steps of providing a body of wax-containing oil diluted with a liquefied normally gaseous hydrocarbon, withdrawing a portion of the liquefied hydrocarbon from above the surface of the body whereby to chill said body and maintaining circulation in said body by providing a constricted channel within said body and communicating therewith at its extreme upper and lower portions and injecting a light fluid into the lower portion of said channel in the direction of circulation.

2. In a method for removing wax from wax-containing oil the steps of providing a body of wax-containing oil diluted with a liquefied normally gaseous hydrocarbon, withdrawing a portion of the liquefied hydrocarbon from above the surface of the body whereby to chill said body and maintaining circulation in said body by providing a constricted channel within said body and communicating therewith at its extreme upper and lower portions and injecting a liquefied normally gaseous hydrocarbon into the lower portion of said channel in the direction of circulation.

3. A method as in claim 2 in which the injected liquefied normally gaseous hydrocarbon comprises propane.

4. A method as in claim 2 in which the liquefied normally gaseous hydrocarbon is injected at a rate proportional to the rate of liquefied hydrocarbon withdrawn from above the surface of the body being chilled.

5. In a method for removing wax from a wax-containing oil, the steps of providing a body of wax-containing oil diluted with a liquefied normally gaseous hydrocarbon under superatmospheric pressure, withdrawing a portion of the liquefied hydrocarbon under a reduced pressure from above the surface of the body whereby to chill said body and precipitate wax, maintaining circulation in said body by providing a constricted channel within said body and communicating therewith at its extreme upper and lower portions and injecting a liquefied normally gaseous hydrocarbon in an amount proportional to the amount of liquefied hydrocarbon withdrawn from above the surface of the body being chilled into the lower portion of said channel in the direction of circulation and withdrawing chilled solution containing precipitated wax from the chilled body.

BLAIR G. ALDRIDGE.